Oct. 17, 1967 H. R. NORDIN 3,347,679
MEAT TREATING METHOD AND APPARATUS
Filed July 21, 1964
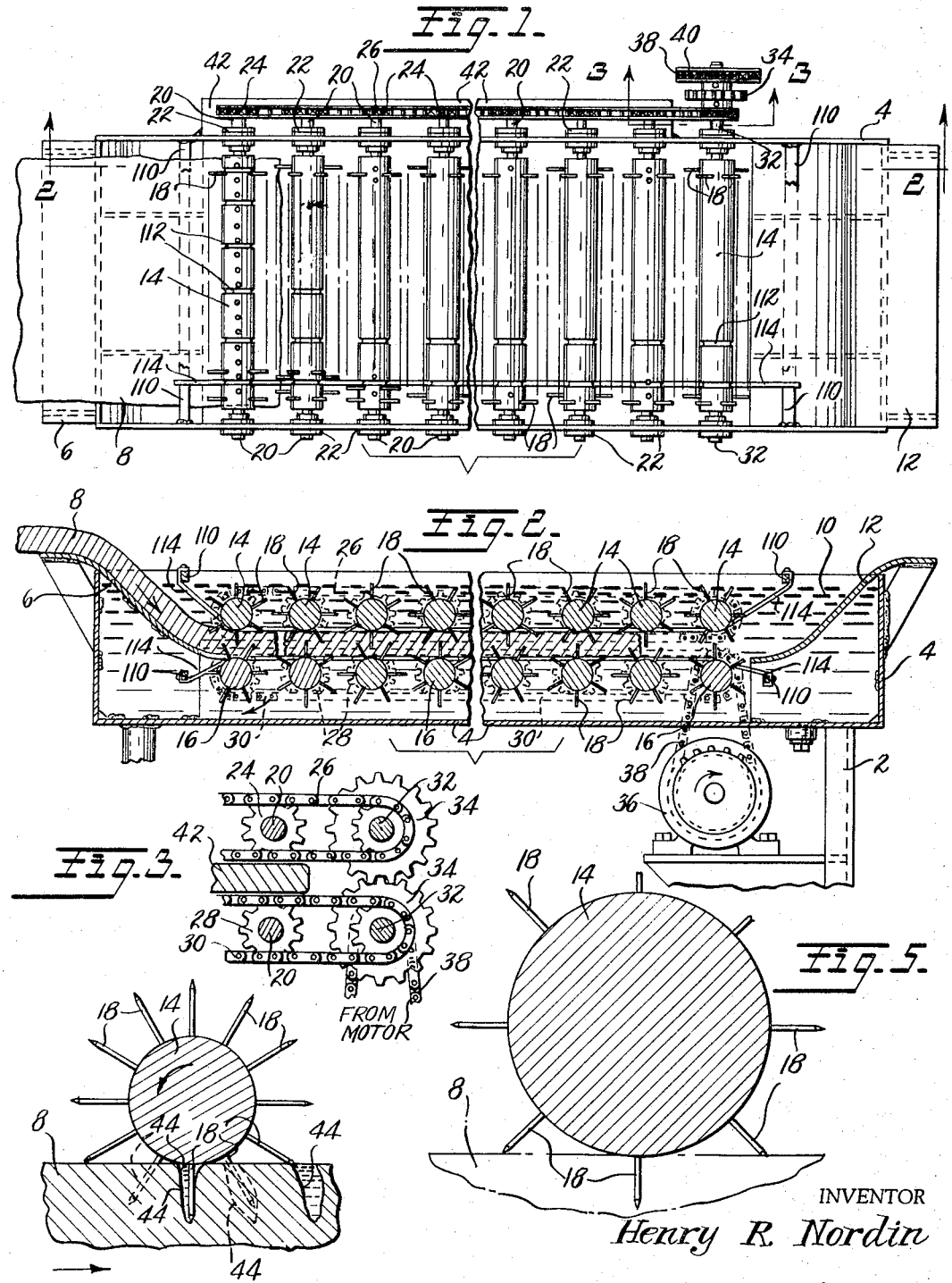
INVENTOR
Henry R. Nordin
BY Bacon & Thomas
ATTORNEYS Oct. 17, 1967     H. R. NORDIN     3,347,679
MEAT TREATING METHOD AND APPARATUS
Filed July 21, 1964     2 Sheets-Sheet 2
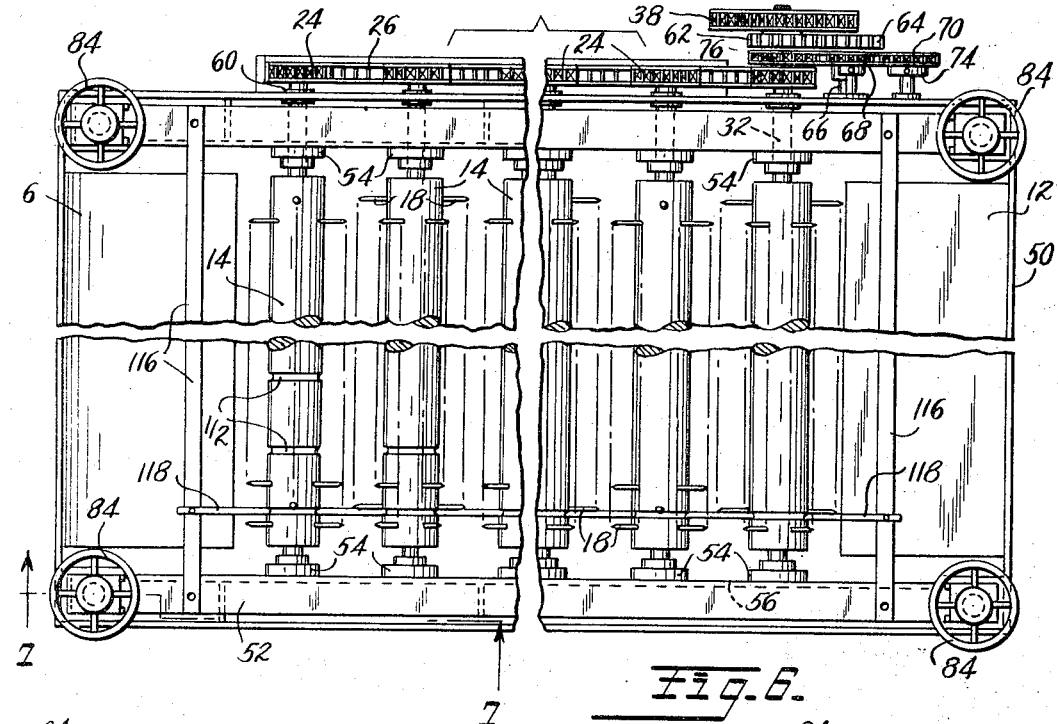
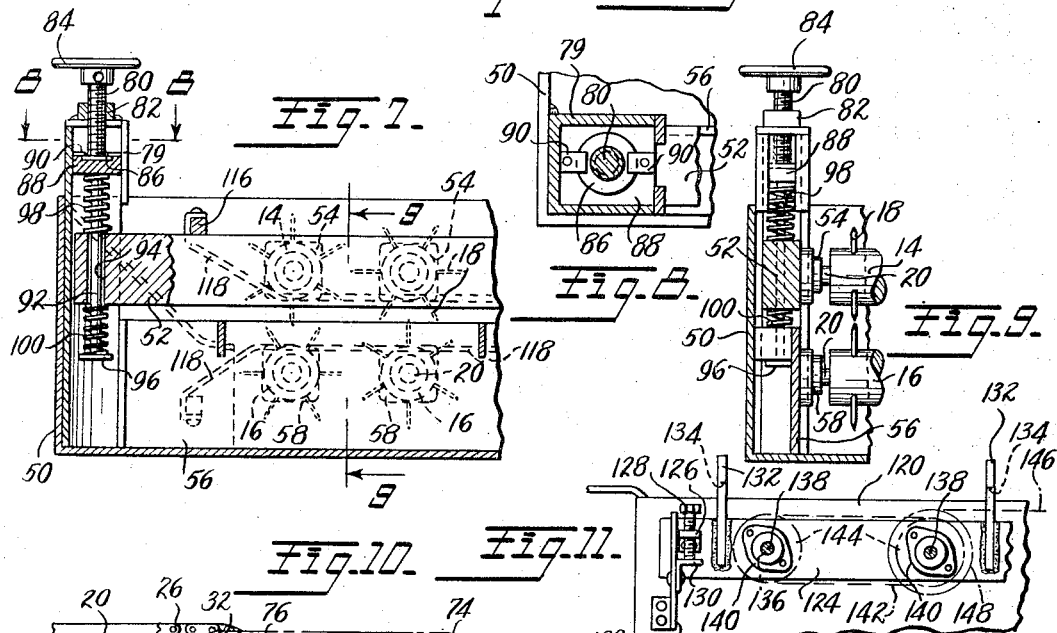
INVENTOR
Henry R. Nordin
BY Bacon & Thomas
ATTORNEYS though it is to be understood that the inventive principles encompass other meat treatments.

United States Patent Office 3,347,679
Patented Oct. 17, 1967

3,347,679
MEAT TREATING METHOD AND APPARATUS
Henry R. Nordin, Maple, Ontario, Canada, assignor to Canada Packers Limited, Toronto, Ontario, Canada
Filed July 21, 1964, Ser. No. 384,059
6 Claims. (Cl. 99—107)

This invention relates to a method and apparatus for the rapid curing of meats, such as bacon, for example, by incorporating therein a suitable curing solution. The principles of the invention, however, are applicable to the incorporation of tenderizing solutions into any meat cuts and/or other treating solutions and while the description herein is directed specifically to the curing of meats, such as bacon, it is to be understood that the inventive principles encompass other meat treatments.

In the meat industry in general, it is customary to introduce a curing pickle into a meat product prior to smoking, cooking or canning. This results in the development of the characteristic cured flavor and color and also increases the resistance of the product to bacterial spoilage.

A variety of methods have been developed for accomplishing this in a fairly uniform way but side bacon is a particularly difficult product in view of its relatively small proportion of lean meat which is interleaved by layers of fat. This makes the product less retentive of pickle and results in generally low and variable curing gains. In a commonly used method developed for bacon curing, pickle is injected into the product at high pressures through hollow perforated needles. The pools of pickle so introduced are allowed to diffuse into the meat over a period of several days at refrigerated temperatures, before the product is heat treated. While this method does give the required addition of curing pickle, it frequently results in incomplete absorption of the pickle pools which subsequently become evident as unsightly wetness and excessive breakage on slicing. Also, in spite of the care taken to filter the curing pickle, the small perforations in the needles frequently become blocked, thus increasing the variability of the curing gain and the incidence of pickle pockets as more pickle is forced through the remaining open needles. Furthermore, the types of machines now commonly used for this operation are complicated, expensive, difficult to clean, and consequently expensive to maintain.

It is necessary to provide several days curing time to allow the pickle to diffuse throughout the belly from the site of each pickle pool injected. Any reduction in this time results in unevenness of color and increased incidence of pickle pockets when the product is sliced.

This problem might be reduced by increasing the number of needles but this would further complicate the machine, and since needle perforations would have to be smaller, it would increase the problem of blockage.

The object of this invention is to provide a method of and apparatus for incorporating pickle or other solutions into meat which will result in a more even distribution of the pickle and a more rapid curing time. It has been found that substantially complete curing can be obtained in a period of 3-5 hours. Since no injection is involved, no pickle pockets are formed and since the holding time is so short, refrigerated conditions need not be maintained. The machine is simple in construction, inexpensive to maintain, and since no injection is involved, is free from needle blockage problems.

In brief, the present invention comprises a method and apparatus wherein a cut of meat is first submerged in a suitable pickle or other solution and while submerged, the surface of the meat cut, preferably from both sides, is perforated with a multitude of perforations dispersed over substantially the entire surface of the meat. The perforations are formed to a substantial depth, preferably to penetrate substantially to the midsection from each side and as they are formed, the perforations are crowded to an open or stretched condition to admit pickling or other desired solution into the meat. In one embodiment of the invention, a controlled pressure is applied to the surface of the meat while it is being perforated. It has been found that by so perforating a cut of meat to admit solution thereinto and thereafter submerging the treated cuts in a cover solution, the curing time to produce a product comparable to that cured in the conventional manner, can be reduced to a total time of from three to five hours and refrigeration is not necessary. The incorporation of the solution in the meat without refrigeration, that is, at about 60°–70° F., hastens pickle diffusion and color development.

In a preferred form of apparatus for performing the method, opposed pairs of rollers are mounted within a liquid-tight container at a level to be positioned below the surface of a pickling solution therein and the rollers are simultaneously driven to advance a cut of meat therebetween. The rollers are provided with extending spikes or tines, which enter and penetrate the meat and at the same time crowd the meat from the opening thus formed to a temporarily larger size, thus facilitating immediate entry of the solution into the meat. In one embodiment, the pressure applied by the rollers to the surface of the meat can be regulated within desired limits.

It is, therefore, an object of this invention to provide a novel method and apparatus for curing or otherwise treating meat in a much shorter period of time than previously possible.

Another object of the invention is to incorporate a curing or treating solution into a cut of meat rapidly and uniformly so that the curing period prior to smoking or cooking can be completed at ordinary temperatures, without refrigeration.

Still another object is to provide a continuous method and apparatus of incorporating treating solution into meat cuts by forming perforations in the meat cuts while they are advanced through a body of the treating solution beneath the surface thereof.

Further and additional objects will become apparent to those skilled in the art as the description proceeds with reference to the accompanying drawings wherein:

FIG. 1 is a top plan view of a first exemplary embodiment of the invention;

FIG. 2 is a vertical sectional view taken substantially along the line 2—2 of FIG. 1;

FIG. 3 is a fragmentary enlarged sectional view on the line 3—3 of FIG. 1;

FIG. 4 is a schematic detailed view showing the action of the spiked rollers in perforating the meat and enlarging the openings therein by crowding action;

FIG. 5 is a view illustrating a spiked roller of somewhat modified proportions;

FIG. 6 is a top plan view of a second embodiment of the apparatus;

FIG. 7 is a vertical sectional view taken along the line 7—7 of FIG. 6;

FIG. 8 is an enlarged detailed sectional view on line 8—8 of FIG. 7;

FIG. 9 is a vertical sectional view taken along the line 9—9 of FIG. 7;

FIG. 10 is a schematic side view of a portion of the drive means for the embodiment of FIG. 6, as seen looking downwardly from the top of FIG. 6 at the right-hand end thereof; and FIG. 11 is a fragmentary diagrammatic view of a portion of a further embodiment of the apparatus.

The machine shown in FIGS. 1–4 comprises a suitable frame 2 on which a fluid-tight container or tank 4 is supported. The tank 4 is provided with an inlet guide plate 6 for guiding a cut of meat, such as the slab of bacon 8, into the container to be submerged below the surface of a treating solution 10 in the container. The solution 10, in the case of bellies, is preferably a strong brine (70° salometer). The container contains not only the solution 10 but a series of spiked rollers to be described in more detail hereafter. The plate 6 guides the product 8 between upper and lower rollers. After the meat has progressed through the rollers, as will be described, it encounters a discharge or outlet guide plate 12, which directs the cuts of meat upwardly out of the tank 4 and into a second tank of larger capacity (not shown) in which the treated cuts of meat are held under pickle or other cover solution for the required length of time, as will be discussed in more detail later. Within the tank or container 4 are a plurality of pairs of rollers, each pair comprising an upper roller 14 and a lower roller 16 spaced therebelow. Each pair of rollers is provided with a multiplicity of radially extending spikes or tines 18, along the length of the roller and around its periphery, and each is mounted on a transverse shaft 20. The shafts 20 extend through suitable openings in opposite side walls of the container 4 and are mounted in properly sealed bearings 22 whereby the solution 10 is held in the container 4 without substantial leakage. As shown in FIG. 1, each of the shafts 20 extends a substantial distance outwardly beyond the bearings 22 on one side of the tank 4 and at its outer extending end each shaft 20 is provided with a sprocket wheel 24. The sprocket wheels 24 are all in substantially the same plane. The sprocket wheels 24 on the shafts 20 of the upper rollers 14 of each pair are all drivingly interconnected for simultaneous rotation by the drive chain 26. The chain 26 is arranged so that all the rollers are simultaneously driven in the same direction of rotation and at the same speed. Similarly, the shafts 20 of the lower rollers 16 of each pair are likewise provided with aligned sprocket wheels 28 similarly simultaneously driven by a common drive chain 30. The shafts 32 supporting an endmost pair of rollers 14 and 16 (at the discharge end as shown in the drawings) are further provided with meshing gears 34 (see FIG. 3) fixed thereon so that the upper and lower shafts 32 are forced to rotate in opposite directions. A suitable motor 36 drives through a chain 38 to a sprocket 40 on one of the shafts 32. Thus, the motor 36 causes all of the rollers 14 and 16 to rotate simultaneously and positively, with the upper rollers turning clockwise, as viewed in FIG. 2 of the drawings. In this manner, the spikes 18 engage opposite faces of the cut of meat 8 and forcibly advance the same toward the discharge end of the apparatus. Simultaneously, the spikes 18 enter and perforate the cut of meat and since the meat is submerged below the surface of the solution 10, the solution immediately enters those perforations to be absorbed by the meat itself.

As shown in FIGS. 1 and 3, the side of the tank 4 adjacent the sprocket wheels 24 and 28, is provided with a fixed guide rail 42 extending between the adjacent runs of the chains 26 and 30. The rail 42 slidably engages the outer edges of those chains to hold them in positively meshed relation with their respective sprocket wheels 24 and 28 and thus prevent the chains from slipping over the teeth of the sprocket wheels when under load.

By referring to FIG. 4, it will be noted that rotation of the roller 14 carrying the spikes 18 in the direction indicated by the curved arrow will cause the cut of meat 8 to advance in the direction of the arrow therebelow and the spikes 18 progressively and sequentially enter the body of the cut of meat and form perforations therein. Since the actual linear speed of the different radial portions of each spike is different, there will be relative motion between the spikes and the meat in the forward direction and the spikes will thus not only form perforations but will actually stretch or distort those perforations, somewhat as indicated at 44 in FIG. 4. This distortion, or crowding of the material of the meat does not substantially tear the fibers of the product since they are somewhat resilient but it at least temporarily stretches the openings in the direction of motion to facilitate entry of the solution therein and to retain an appreciable quantity of solution in position to be absorbed by the cut of meat for a substantial period of time.

It is to be noted that the spikes projecting from the upper rollers 14 are so angularly related to those projecting from the lower rollers 16 that they enter the meat in offset relation rather than directly opposite each other. In addition, the spikes on each succeeding pair of rollers are so angularly related to the spikes on the preceding pairs that they will not enter the same perforations formed by the preceding pair but will form further perforations displaced from those previously formed. Thus, the number of perforations formed in each cut of meat is dependent upon the number of pairs of rollers employed. Obviously, even a single pair of rollers would provide for the introduction of some solution into the meat whereas an increase in the number of pairs of rollers increases the amount of solution introduced and improves the uniformity of distribution of the solution throughout the cut.

It is obvious, therefore, that it is possible to obtain very close spacing of perforations without having to provide an undue number of spikes on any particular roller. Because of the crowding action of the meat away from the spikes, it would not be possible to provide each roller with a multitude of closely spaced spikes since this would result in chewing and tearing up the meat product. Extremely close spacing of the perforations, however, can be achieved by passing the meat through successive pairs of rollers, as described. It is contemplated that as many as 30 pairs of rollers may be employed in some instances, which could thus provide a spacing between perforations of about $\%_{32}$ of an inch while using spines having diameters of approximately $\%_{32}$ of an inch.

Since the spines 18 perform the crowding action described above, there is likelihood that they will tend to lift the entire piece of meat or at least portions thereof as they leave the perforations. To prevent any lifting of the meat out of its normal path of travel and thereby strip the same from the rollers, the apparatus is provided with stripping means. As seen in FIGS. 1 and 2 transverse supporting pairs of rods 110 extend between opposite walls of the tank or container 4, a pair of them near the top of the tank at opposite ends of the upper row of rollers and another pair in the lower portion of the tank opposite the ends of the lower row of rollers. Each of the rollers is provided with a plurality of transversely spaced circumferential grooves 112 with the grooves in adjacent rollers aligned with those in the other rollers. A plurality of elongated stripper bars 114 are secured at their opposite ends to the upper bars 110 and a similar plurality of stripper bars are fastened at their opposite ends to the lower support bars 110. Those stripper bars are directed in converging relation from the bars 110 toward the space between the upper and lower rollers of the pairs and then extend therealong, lying in the grooves 112 so as not to project outwardly beyond the periphery of the rollers. A plurality of such stripper rods are arranged transversely above and below the path of movement of the meat and since they extend in the direction of meat movement substantially tangentially of the rollers, they will be effective to strip the meat from the splines as the product progresses through the apparatus. The manner of operation of these stripper rods will be obvious to those skilled in the art and need not be further described.

*Example 1*

In one test of the invention, a fresh belly was perforated repeatedly on both sides under the surface of a pickle solution by use of a spiked roller and the product was weighed after each pass. The following table shows the percentage gain in weight of the cut after each successive perforation:

TABLE I

*Effect of number of passes on pickle absorption*

| No. of passes: | Pickle absorbed (percent) |
|---|---|
| 1 | 1.6 |
| 2 | 2.6 |
| 3 | 3.4 |
| 4 | 4.3 |
| 5 | 5.1 |
| 6 | 5.6 |
| 7 | 6.3 |
| 8 | 7.1 |
| 9 | 7.9 |
| 10 | 8.4 |
| 11 | 9.4 |
| 12 | 10.4 |
| 13 | 10.9 |

The number of passes indicated in the above table is representative of successive passes through the same pair of rollers or through a number of pairs of rollers in an apparatus, as described hereinabove and it is to be noted that even after being perforated on both sides by the equivalent of 13 pairs of rollers, the product still showed a substantial gain in weight, indicating the amount of solution absorbed thereby.

*Example 2*

In a second test, fresh bellies were perforated under 70° salometer pickle by the spiked roller on each side 15 times so as to make about 6000 perforations in the belly. The bellies were then held under 20° salometer cover pickle for various lengths of time and then smoked immediately.

The following table shows the amount of pickle retention after being immersed in the cover solution for the indicated period of time and also after smoking. The amount of pickle retained is indicated as a percentage of the original fresh weight in that the values shown indicate the weight after processing as a percentage of the original weight of the untreated meat:

TABLE II

[Effect of cover time on pickle retention]

| Retention after Rolling (percent) | Time in Cover Pickle (hrs.) | Retention after Covering (percent) | Retention after Smoking (percent) | Cured Color |
|---|---|---|---|---|
| 107.6 | 1 | 109.1 | 97.4 | Poor. |
| 107.7 | 3 | 110.2 | 99.6 | Fair. |
| 107.6 | 5 | 110.1 | 99.7 | Good. |
| Control | (1) | 109.0 | 99.0 | Good. |
| 107.2 | 0 | [2] 104.1 (3 hrs. holding) | | |

[1] Conventional bacon.
[2] Retention after holding 3 hours on combs at room temperature.

The control sample was treated with pickle solution in a conventional injection curing machine and cured for three days under cover pickle. It had about the same yield and color quality as the bellies cured five hours with the present method.

In order to obtain the proper salt concentration, it is preferable that the bellies be perforated under a strong brine (e.g., about 70° salometer).

The "covering" referred to in the above table is the holding of the product in the second tank into which the meat is discharged by the machine shown herein. It is to be noted that 5 hours is about the maximum time the meat need be held in the cover solution to achieve the same product quality as previous methods, and no refrigeration is needed during that time. The covering brine is usually more dilute than that in tank 4, with a specific gravity more nearly that of the meat itself (about 20° salometer). However, it is contemplated that the perforated product may go into pickle from about 20° salometer up to about 60° salometer.

The relative dimensions of the rollers and spines also has some effect on the performance of the invention, in an obvious way. Thus, FIG. 4 illustrates a relatively small roller having long spikes thereon whereas FIG. 5 illustrates a relatively large diameter roller having shorter spikes thereon. In each instance, however, the spikes themselves are long enough to reach at least about the midsection of the cut of meat being treated. As will be obvious from FIGS. 4 and 5, the angle between corresponding spikes on a smaller roller where the number of spikes in a single diametral plane is the same. Thus, the total angular rotation of the larger roller to move a spike from full penetration to complete release is less than that for the smaller rollers and less distortion or stretching of the meat occurs. (In FIG. 4 only alternate spikes, of those shown, are in the plane on which the section is taken.) However, sufficient crowding occurs to open the perforations sufficiently to admit an adequate quantity of curing solution. Therefore, by using larger rollers, a fewer number of pairs may be employed to achieve the same density of perforations but the crowding action of the spikes becomes less. It is believed that an optimum range of diameters for the rollers is from two to about four inches.

*Example 3*

The effect of curing time and the number of passes (using a 4" spiked roller) on the curing gain is illustrated in Table III. A cover time of 2–7 hrs. was used and bellies were rolled 15–30 times on both sides under a normal bacon curing pickle. The initial curing gain and the final yield of smoked side bacon is given expressed as a percent of the original weight.

TABLE III

[Effect of number of passes and curing time on bacon yield]

| | Cover Time (hrs.) | No. of Passes | | | Avg. |
|---|---|---|---|---|---|
| | | 15 | 22 | 30 | |
| Absorption (percent) | 7 | 6.4 | 10.5 | 11.6 | 9.5 |
| | 4 | 7.0 | 11.8 | 12.4 | 10.1 |
| | 2 | 7.1 | 10.2 | 11.8 | 9.5 |
| Average | | 6.8 | 10.8 | 11.9 | |
| Final Yield (percent) after smoking | 7 | 96.8 | 98.3 | 100.2 | 98.4 |
| | 4 | 96.5 | 98.1 | 98.2 | 97.7 |
| | 2 | 95.5 | 97.8 | 97.4 | 96.9 |
| Average | | 96.3 | 98.0 | 98.7 | |

It is evident that the yield can be influenced by either the cover time or the number of rollings.

*Example 4*

In another test using 5 pairs of pork bellies, the left bellies were rolled 30 times under pickle using a 4" roll. The corresponding pairs were cured using conventional methods. The test bellies were then held 2½ hrs. before smoking. Table IV gives the initial gain, the final yield expressed as a percent of the green weight and the color preference rating of the sliced finished product.

TABLE IV

[Comparison of roller cured and conventional bacon]

| | Roller Cured | Conventional |
|---|---|---|
| Initial gain (percent) | 18.7 | 12.1 |
| Yield (percent of green wt.) | 104.0 | 103.0 |
| Color Preference | 17 | 8 |

It will be seen that the color of the roller cured product was preferred by the test panel.

Example 5

Two pork backs were rolled under a normal back bacon pickle 15 times on each side using a 2¼" diameter spiked roller, then smoked immediately. The percent absorption and the final yield are given in Table V. A second test also detailed in Table V gives the final yield when two backs were held in cover for 5 hrs. after rolling before smoking. In both tests a well developed cured bacon resulted.

TABLE V

[Effect of cover time on back bacon yield]

|  | 0 hrs. Cover | 5 hrs. Cover |
| --- | --- | --- |
| Initial Gain (percent) | 14.1 | 12.5 |
| Final Yield (percent) | 94.9 | 97.7 |

The initial gain is the percent pickle absorption after rolling, and final yield is expressed as a percent of the green weight.

When the backs are covered with pickle for a time after perforating before smoking, the loss of absorbed pickle is reduced.

It has also been found that the pressure applied to the meat between the surfaces of the rollers of each pair has some effect on the effectiveness of the method of this invention. Within limits, greater pressures applied to the meat while perforating same, result in greater absorption of pickle solution and tests indicate that there is not a great deal of difference in pickle absorption when bellies are rolled with two inch or four inch rollers, if the same pressure is used. The range of pressures beneficially employed is of the order of up to 50 pounds total force on a roller extending across the cut of meat. The following example illustrates the use of pressure.

Example 6

Pork bellies were perforated using various pressures on the roll. Table VI shows the initial gain after 15 passes on each side using a 4" roll.

TABLE VI

[The effect of roll pressure on pickle absorption]

|  | [1] Light Pressure | Medium Pressure | [2] Heavy Pressure |
| --- | --- | --- | --- |
| Percent Absorption | 4.3 | 5.6 | 8.5 |

[1] Light Pressure, about 10 pounds total pressure on roll.
[2] Heavy Pressure, about 50 pounds total pressure on roll.

In view of the effect of pressure on pickle absorption, the present invention contemplates a further modified form of apparatus wherein the pressure exerted by the rollers may be regulated to the desired value. FIGS. 6 through 10 show such an embodiment.

In this embodiment of the invention, a liquid-tight tank 50, similar to the tank 4 of FIG. 1, is provided and the plurality of the pairs of rollers 14 and 16 and which are rotatably mounted within the tank in the same relative positions and to perform the same functions as described in connection with the first embodiment. However, the upper rollers 14 of each pair are all mounted on a vertically movable assembly comprising a pair of longitudinal beams 52. That is, the bearings 54 supporting the upper rollers 14 are carried by the beams 52. By referring to FIG. 8, it will be seen that the tank or container 50 is provided with an inwardly spaced wall 56 of limited height upon which the bearings 58 for the lower rollers 16 are fixedly mounted. At the opposite end of the rollers from that shown in FIG. 8, the shafts 20 extend outwardly through the side wall of the container 50 and are provided with sprockets which may be identical to the sprockets 28 described in connection with FIG. 1. The upper rollers 14, however, are journalled in bearings 54, mounted on the vertically movable beams 52. At the end opposite that shown in FIG. 8, the shafts of the upper rollers 14 extend through vertically elongated slots (not shown) in the side wall of the container 50 for vertical movement therein. Obviously, those shafts also extend through the beam 52 at that side of the tank. Suitable sealing means 60 (see FIG. 6) are slidable along those slots and function as sealing means to retain the treating solution in the tank regardless of the position of the upper shafts along their respective slots. Such seals are known to those skilled in the art and need not be described in further detail. As an alternative, the seals may be omitted entirely and the depth of the pickle solution adjusted so that its upper surface reaches the lower edges of the upper rollers but not the slots referred to. The outer ends of the shafts of the upper rollers of each pair are also provided with sprocket wheels 24 engaged by a common drive chain 26, as already described. The sprockets 28 on the outer ends of the shafts of the lower rollers are likewise all drivingly engaged by a chain 30, all as described in connection with FIG. 1 and shown schematically in FIG. 10. In this embodiment, however, provision must be made for vertical movement of the shafts of the upper rollers while maintaining a positive drive thereto. As shown in FIGS. 6 and 10, the shaft 32 of an endmost lower roller is provided with a gear 62 thereon meshing with a second gear 64 journalled on a side wall of the tank and carried by a shaft 66. A sprocket wheel 68 is also fixed to the shaft 66 and drivingly engages a chain 70 trained over idler sprockets 72 and 74 and over a driven sprocket 76 on the vertically movable upper shaft 32. Thus, the upper shafts and their rollers may be moved vertically toward or away from the lower rollers while still maintaining a positive timed drive therebetween. Limited vertical movement, within the necessary range is permitted by the horizontal portions of the chain 70.

The ends of the vertically movable beams 52 are guided for vertical movement by guide channels 79 (see FIG. 8) and may be adjustably positioned by means comprising screws 80 threaded through suitable nuts or the like 82 secured to the tank structure at the top of the guide channels 79. Each of the screws 80 is provided with a hand wheel 84 at its upper end and a head 86 at its lower end rotatably received in a complementary recess in a slide block 88, also guided vertically by channels 79. Suitable plates 90 hold the heads 86 in their respective recesses to enforce movement of block 88 in both directions in response to movements of the screw 80.

A rod 92 is secured to each block 88 and extends downwardly therefrom through an opening 94 in the end of the corresponding beam 52. The rods 92 extend downwardly from the beams and terminate in heads 96 at their lower ends. Suitable compression springs 98 and 100 are interposed between the block 88 and beam 52 and between the head 96 and beam 52 whereby the beams, and the rollers supported thereby, may be vertically adjusted to a desired spacing whereby a predetermined pressure will be exerted on the cuts of meat processed by the apparatus. The pressure is actually applied by the weight of the beams and rollers, augmented by the compression of the upper springs 98, which is adjusted by rotary adjustment of screws 80. The compression of the springs 98 may be regulated to effect the desired pressure on the meat.

In the above-described embodiment, the springs 98 are not absolutely essential since ordinarily the weight of the rollers 14 and the beams 52 will be sufficient to provide the necessary pressure on the meat. However, for meat products of varying thickness, the springs 98 perform a useful function. An an alternative, the springs could be eliminated and the pressure of the rollers could be increased by merely adding dead weight to the beams 52.

In this second embodiment also, it will be noted that transverse support bars 116 are provided to support and position stripper bars 118 for the same purpose as described in connection with FIGS. 1 and 2. The upper support bars 116 are mounted on and carried by the beams 52 so that their stripper bars 118 will move vertically with the upper rollers. The lower bars 118, however, are secured to fixed portions of the tank or container 50 since the lower rollers do not move.

FIG. 11 shows a still further modification of the invention wherein the upper rollers are vertically adjustable by means different from that disclosed in FIGS. 6 through 10. In this embodiment, the tank or container 120 is provided on its opposite outer side with suitable brackets 122 having their inner edges spaced somewhat from the adjacent tank wall to define guide slots for vertically adjustable plates 124. The plates 124 preferably lie flat against the outer faces of the tank walls. The plates 124 are provided with brackets 126 fixed thereto and through which threaded adjusting screws 128 are threaded to bear upon fixed brackets 130 carried by the brackets 122. Obviously, the described adjusting means will be effective to regulate the height of the plates 124. The plates 124 on opposite sides of the tank are rigidly joined by arch members 132 which are of inverted U-shape, with their parallel legs engaging and being welded to the plates 124. The bight portion 134 of each arch 132 extends across the top of the tank 120 slightly spaced thereabove to permit the plates 124 to be simultaneously raised and lowered through the required range of movement. The side walls of the tank 120 are provided with vertical slots 136 through which the shafts 138 for the upper rollers pass. The shafts 138 are journalled in suitable bearings 140 fixed to the outer face of the plates 124 whereby vertical movement of the plates 124 produces a like vertical adjustment of the rollers on the shafts 138. In FIGS. 6 to 10, the pairs of rollers are shown as being driven by continuous chains engaging all of the sprockets on the upper rollers and/or the lower rollers. FIG. 11 illustrates a modified form of drive wherein a drive chain 142 extends over sprockets 144 on adjacent shafts but wherein a second or further chain 146 drivingly connects alternate adjacent shafts by being trained over second sprockets 148. The shaft 138, shown at the left of FIG. 11, has only one sprocket 144 fixed thereon whereas the next shaft 138 and all other shafts extending up to the driving end of the assembly are provided with two sprockets 144 and 148. Thus, each drive chain engages only two sprockets and eliminates the necessity of providing such means as the rail 42 previously described for holding the drive chains in driving connection with their respective sprocket wheels. In this form also, the shafts 138 may be provided with suitable sealing means to prevent loss of pickle solution through slots 136, or as an alternative, the level of the liquid in the tank 120 may be maintained just high enough to touch the upper rollers without reaching the level of those slots.

While a limited number of specific embodiments of the invention have been shown and described herein, it is to be noted that the same are merely exemplary and show forms of apparatus capable of performing the method of the invention. The invention itself encompasses other embodiments falling within the scope of the appended claims.

I claim:

1. A method for incorporating treating solution in a piece of meat, comprising: submerging said piece of meat in a body of said treating solution beneath the liquid level thereof and, while said piece of meat is submerged in said body of solution, causing relative movement between said piece of meat and at least one spiked roll to thereby mechanically form multiple perforations in said piece of meat while crowding the meat material of the piece away from each perforation so as to admit treating solution into said perforations from the body of solution and applying pressure to at least one spiked roll to exert a rolling pressure on said meat piece as it is being perforated.

2. A method of preparing bacon comprising submerging a fresh pork piece in a body of pickle solution beneath the liquid level thereof and, while said pork piece is submerged in said body of pickle solution, causing relative movement between said pork piece and at least one spoked roll to thereby mechanically form multiple perforations in said pork piece while crowding the meat material of the piece away from each perforation so as to admit pickle solution into said perforations from the body of solution, holding said pork piece in a cover pickle solution for a period of time of up to seven hours, and then subjecting the pork piece to a smoking step.

3. Apparatus for treating meat, comprising: a liquid-tight container; at least one pair of spaced opposed members rotatably mounted in said container for rotation about respectively spaced axes, each member having perforating means thereon comprising slender spike elements projecting radially with respect to the axis of rotation of the member for engaging and perforating a piece of meat while it is passing between said members; drive means for simultaneously rotating said members in opposite directions to thereby cause said spike elements to simultaneously perforate both sides of a piece of meat therebetween and move the same in one direction in said container while crowding the meat material of the piece away from each perforation so as to admit treating solution into said perforations from the body of solution; and the container and opposed members being arranged so that a body of treating liquid can be maintained at a liquid level above the gap between said opposed members.

4. Apparatus as defined in claim 3 wherein each of said members comprises a cylindrical roller, said perforating means comprise slender spike elements projecting substantially radially from the surface of each cylindrical roller, said rollers are arranged horizontally in said container, one above the other; and including means supporting one of said rollers for limited vertical movement relative to the other.

5. Apparatus as defined in claim 4 including yieldable means opposing vertical separating movement of said rollers and means for adjusting said yieldable means whereby to regulate the pressure exerted by said rollers on a piece of meat.

6. Apparatus as defined in claim 4 including stripper means between said rollers, said stripper means being stationary, generally tangential to said rollers, and extending in the direction of movement of said piece of meat.

References Cited

UNITED STATES PATENTS

| | | | |
|---|---|---|---|
| 7,766 | 11/1850 | Starkweather | 99—159 |
| 2,471,282 | 5/1949 | Paddock | 99—107 |
| 2,553,533 | 5/1951 | Komarik et al. | 99—159 |
| 2,629,311 | 2/1953 | Graves | 99—255 |
| 2,742,367 | 4/1956 | Bachert | 99—159 |
| 2,821,901 | 2/1958 | Abrams | 99—257 |
| 3,149,554 | 9/1964 | Greenspan | 99—159 X |
| 3,256,801 | 6/1966 | Greenspan | 99—159 X |

HYMAN LORD, *Primary Examiner.*